United States Patent [19]

Malcolm

[11] 4,033,609
[45] July 5, 1977

[54] TRAILED VEHICLE SUSPENSIONS

[76] Inventor: George David Malcolm, 5 James Street, Mangere East, Auckland, New Zealand

[22] Filed: Aug. 14, 1975

[21] Appl. No.: 604,691

[30] Foreign Application Priority Data

Aug. 16, 1974 Australia .......................... 8553/74

[52] U.S. Cl. ................................. 280/718; 267/16
[51] Int. Cl.² ......................................... B60G 11/04
[58] Field of Search ............ 280/699, 718; 267/15, 267/16, 18, 19

[56] References Cited

UNITED STATES PATENTS

| | | |
|---|---|---|
| 1,097,353 | 5/1914 | Olson .................................. 267/16 |
| 2,264,174 | 11/1941 | Crump ............................... 280/718 |
| 2,626,144 | 1/1953 | Stephen ............................. 280/718 |
| 3,013,794 | 12/1961 | Henderson ....................... 267/15 R |

*Primary Examiner*—Philip Goodman
*Attorney, Agent, or Firm*—William Anthony Drucker

[57] ABSTRACT

A suspension for a beam axled trailed vehicle ensures steering characteristics which reduce sway and other objectionable behaviour by moving a wheel subject to bump conditions forwardly as it moves upwardly. The forward movement is achieved by ensuring that the springs allow limited longitudinal travel of the axle and by positioning leading radius rods each to thrust the associated wheel forwardly when it experiences bump conditions.

11 Claims, 4 Drawing Figures

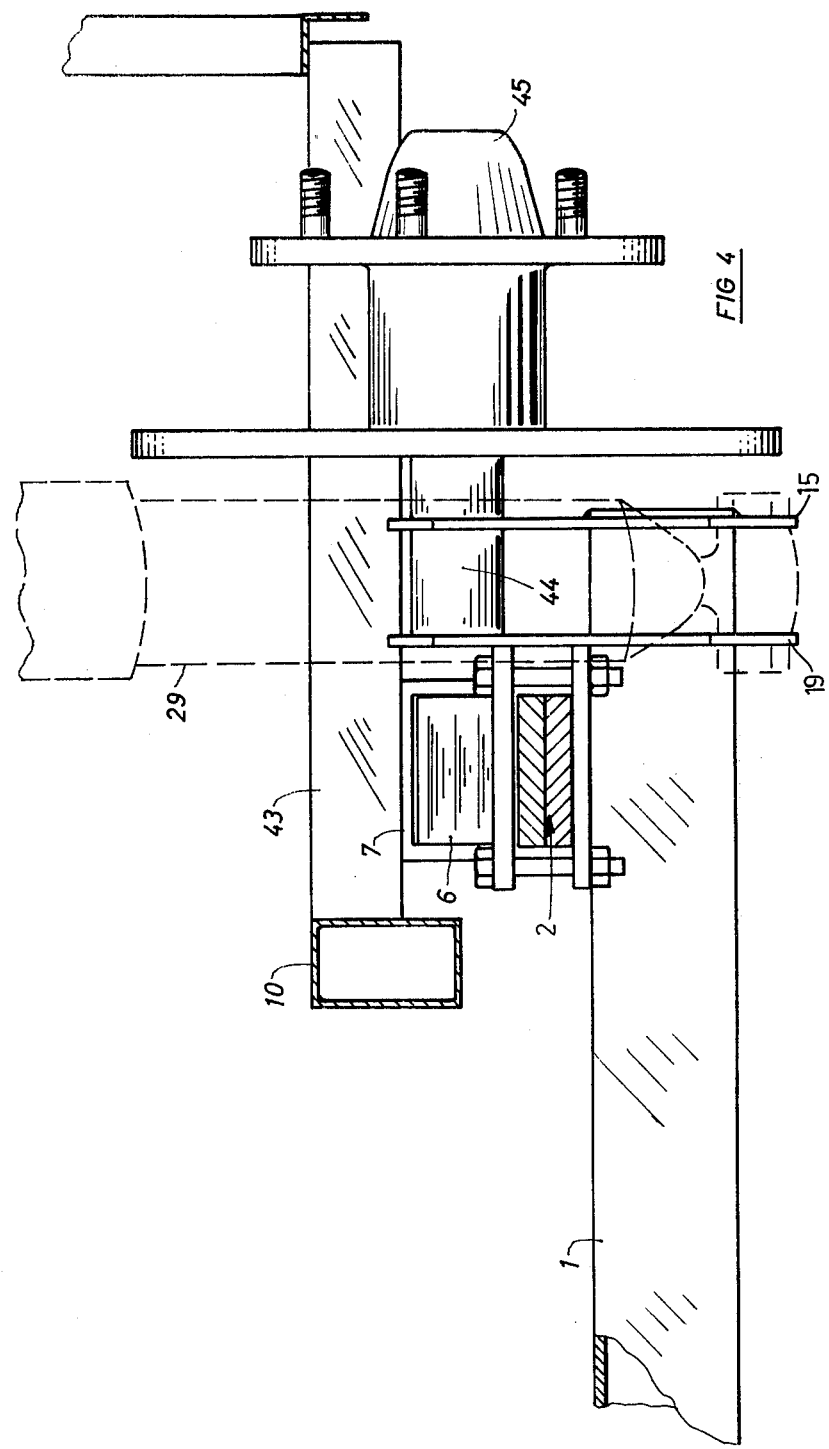

TRAILED VEHICLE SUSPENSIONS

BACKGROUND OF THE INVENTION

This invention relates to a spring suspension for a trailed vehicle. It has been found that, with trailed vehicle beam axle suspension systems currently used a slight backward displacement of a wheel in the opposite direction to that of the trailed motion occurs when a force acts on the wheel to displace it upwardly from its undisturbed position. This introduces a steering effect, since both wheels are interconnected by the axle, tending to increase the effects on the trailed vehicle of the displacing force.

BRIEF SUMMARY OF THE INVENTION

The main object of this invention was to provide a suspension for a trailed vehicle having controlled steering to offset the undesirable effects mentioned above. The present invention consists in a suspension for a trailed vehicle, comprising a beam axle having springs at each side, the spring mountings enabling limited movement of the axle longitudinally of the trailed vehicle and a leading radius arm at each side pivotally attachable to the trailed vehicle chassis behind the beam axle and pivotally attached directly or indirectly to the beam axle so that, when so attached to the chassis, as the beam axle moves upwardly on one side in response to bump conditions, it also moves forwardly imparting a steering effect to the beam axle tending to oppose the effects on the trailed vehicle of the displacing force.

In a second aspect the present invention consists in a trailed vehicle having a beam axle suspension with springs at each side, the spring mountings enabling limited movement of the axle longitudinally of the trailed vehicle and a leading radius arm at each side pivotally attached to the trailed vehicle chassis behind the beam axle and pivotally attached directly or indirectly to the beam axle, so that as the beam axle moves upwardly on one side in response to bump conditions it also moves forwardly imparting a steering effect to the beam axle tending to oppose the effects on the trailed vehicle of the displacing force.

BRIEF DESCRIPTION OF THE DRAWINGS

The above gives a broad description of the present invention, one preferred form of which will now be described with reference to the accompanying drawings in which:

FIG. 4 shows yet another overaxle embodiment by way of a cross-sectional view in a transverse plane across the vehicle just in front of the brake disc, the shock absorber being shown in dotted outline, and details of the radius arm and its upper mounting being omitted for clarity.

In the drawings like parts have been given like reference numbers whereever this would not cause confusion.

DETAILED DESCRIPTION OF THE INVENTION

Figure 1:
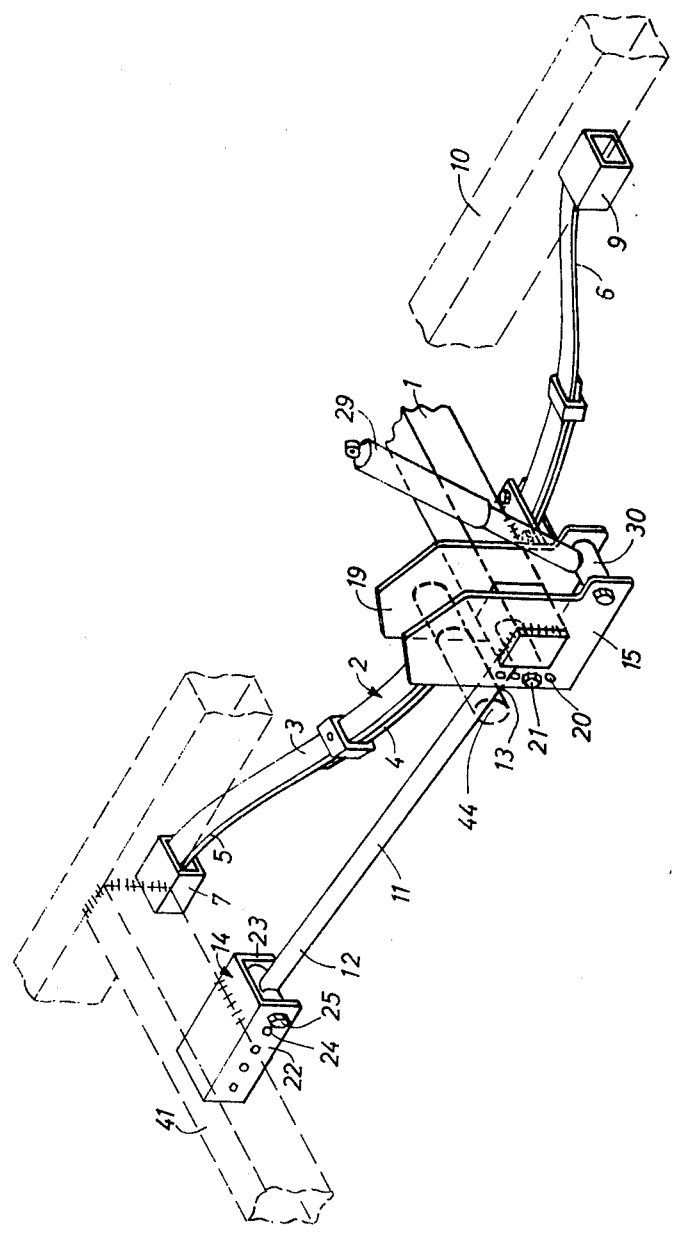
FIG. 1 shows a perspective view of part of a trailed vehicle chassis at one side, the leading end being towards the right, the chassis and hub axle being dotted for clarity. The version shown will be referred to as an underslung version, since the spring passes under the axle.
Figure 2:
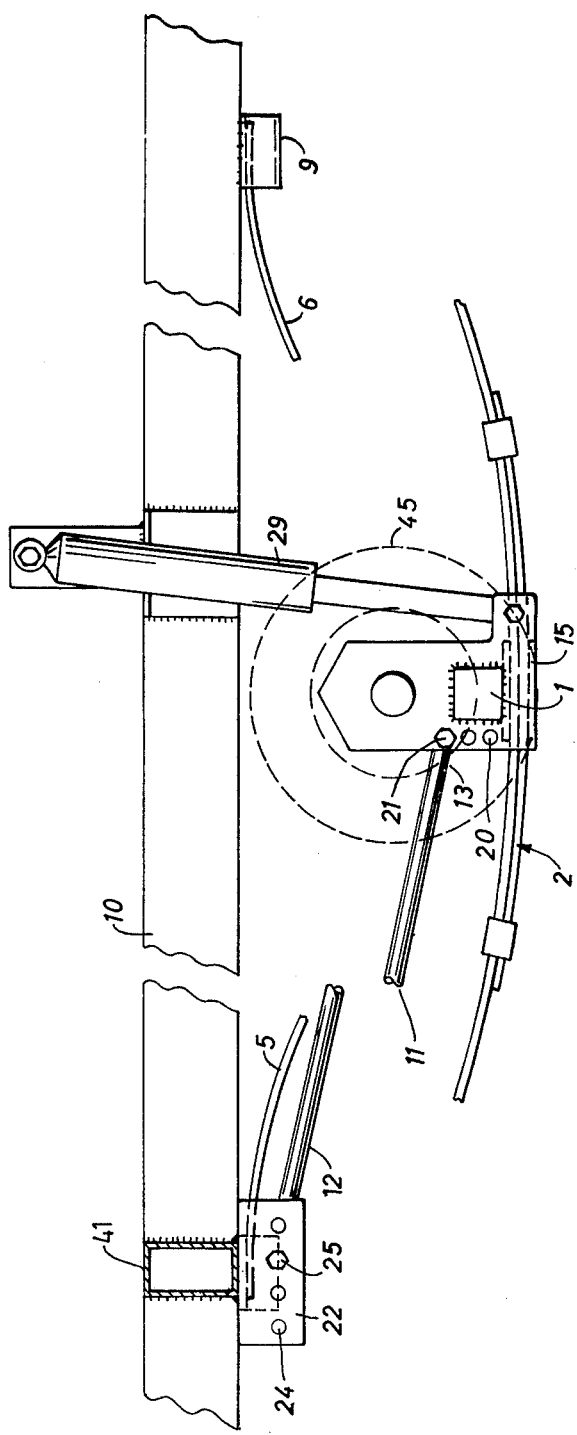
FIG. 2 shows a side elevation of the arrangement illustrated in FIG. 1, the wheel hub and braking disc being shown in dotted outline.

In one preferred underslung form of the present invention as shown in FIGS. 1 and 2 a beam axle 1 is provided with leaf springs 2 at either side which are preferably semi-elliptic when not under load. Each leaf spring may for example, be comprised of two leaves 3 and 4 fastened under the beam axle and having slipper type ends 5 and 6 slideable within slipper boxes 7 and 9 welded to the vehicle chassis longitudinal member 10.

The boxes 7 and 9 permit a limited amount of longitudinal movement of the spring ends 5 and 6, (and thus the axle 1) in relation to the chassis while yet preventing transverse movement of the spring. As an alternative to such slipper type ends, both ends of the spring can be provided with shackles.

In order to maintain the longitudinal position of the beam axle, leading radius arms 11 are employed at either side and each preferably comprises a tube having an eye formed at each end 12 and 13 and one end 12 is pivotally fastened to chassis cross bracket 14 behind the beam axle while the other end 13 of the radius rod is pivotally fastened to the beam axle. The length of the radius arm 11 would approximate half the length of the leaf spring 2 and the end 12 secured to the chassis would be above the end secured to the beam axle so that as the beam axle is raised vertically, such as for example, when the wheel attached to it at that side encounters a bump, the axle is also thrust forwardly by the radius arm. This imparts a steering effect, since both of the wheels are coupled to the beam axle but only one moves forward, and the direction of the steering effect is such that it tends to minimise the reaction of the trailed vehicle on the towing vehicle and the trailed vehicle is stabilised. Naturally if both wheels encounter bump conditions at the same time the steering effect does not occur, but then the trailed vehicle is not usually unstable in such conditions.

In order to provide for adjustment so that the amount of forward movement on a given vertical displacement of the beam axle is adjustable, mounting brackets preferably secured directly to the beam axle 1 comprise a pair of parallel spaced plates 15 and 19 each having opposite rows of vertical aligned holes such as 20 through which a bolt 21 or a pin can pass, the eye of the radius arm end 13 lying between the plates and penetrated by the bolt. Any one of such vertical holes can be chosen as the beam axle coupling point for the radius arm. These then enable the inclination of the radius arm to the horizontal in the normal static load condition (stationary trailer with normal design load) to be altered to any one of a number of positions when used with a fixed length radius arm and an adjustable chassis mounting as will now be described.

On the chassis bracket 41 two parallel plates 22 and 23 are provided spaced apart, each provided with a series of horizontal holes 24 through which a bolt 25 or pin can be passed to secure radius arm end 12. Radius rods of different lengths broaden the possible range of adjustment provided by holes 21 and 24. Radius rods of adjustable length can be used in conjunction with adjustable mountings at one end only to achieve the desired effects.

It is preferable that shock absorbers 29 be provided at each side and these may be inclined slightly inwardly at the top towards the centre of the trailed vehicle and may have the eye 30 provided at the lower end also coupled between the radius arm mounting plates 14 and 15, which can be suitably extended forwardly of the beam axle 1 for this purpose. It is preferable to have the shock absorber 29 lying forwardly of the beam axle to provide the best layout.

It is also possible to offset the leaf springs and mountings with respect to the main longitudinal chassis members 10 which usually run just inside the wheel arch, so that the leaf springs may assume negative camber and rise above the longitudinal chassis members. It is preferable that under normal load conditions the leaf springs be substantially linear. In these conditions there is great lateral stability of the vehicle under roll conditions. Where there is a pronounced camber of the leaf springs when the vehicle is under normal load, and vehicle roll occurs, the leaf springs tend to roll about their ends allowing the beam axle to shift transversely across the vehicle in relation to the chassis and this can lead to awkward handling problems. The offset position allows linear springs to be used and the springs 2 are mounted so that they can flex inside the wheel arch beside the longitudinal chassis member 10, and they preferably pass over the beam axle 1 at the point where they are coupled to it. Such a construction is shown in FIG. 3.

A similarly offset construction is shown in FIG. 4.

Figure 3:
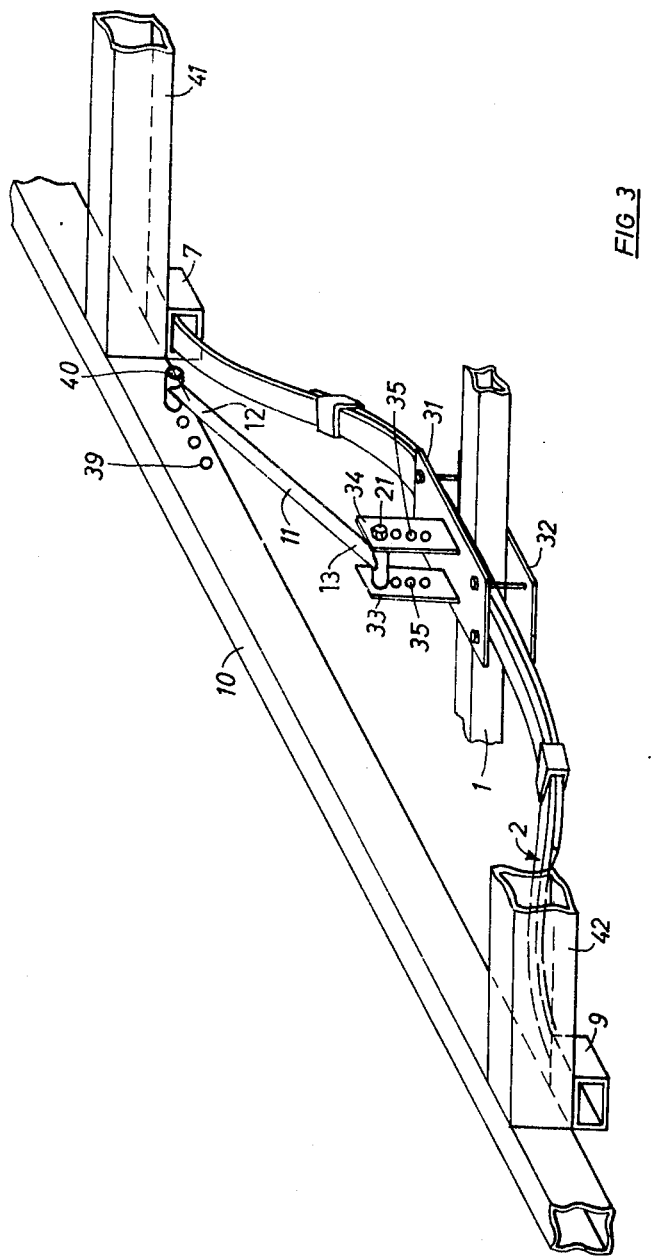
FIG. 3 shows a perspective view of a different embodiment which will be referred to as an "overaxle set up" where the spring passes over the axle; the leading end lies to the left and the spring is shown in dotted outline only for clarity.

In FIG. 3, the leaf spring 2 passes over the beam axle 1 and is clamped to it by clamping plates 31 and 32. On the top clamping plate 31 a bracket is formed by means of two upstanding plates 33 and 34. Each is provided with an opposite row of holes 35. The end 13 of the radius arm 11 is secured within a suitable hole 35 by means of bolt 21.

The upper end 12 of the radius arm is shown pivoted onto the side of the longitudinal chassis member 10 which is provided with a row of holes 39 and in this case a bolt 40 would pass through the eye at end 12 of the radius arm and right through the longitudinal chassis member 10.

As can be seen from FIG. 3 the radius arm lies directly above the spring 2, the slipper boxes 7 and 9 of which are offset on chassis cross brackets 41 and 42. For convenience the shock absorber and hub have not been shown in FIG. 3, but of course it would be appreciated that the hub would be attached to the end of the axle in any acceptable manner, while the shock absorber which is preferably provided could be attached in some suitable manner to the top clamping plate 31.

The embodiment shown in FIG. 4 is somewhat similar in arrangement to the embodiment shown in FIGS. 1 and 2 except that the spring is mounted over the axle instead of being underslung and the slipper boxes 7 and 9 are offset from the main chassis member 10 and are mounted on chassis cross brackets such as bracket 43.

As FIG. 4 shows the axle bracket plates 15 and 19 are penetrated by the stub axle 44 of the hub, which is generally indicated at 45, the stub axle being suitably welded to the plates 15 and 19. It will be appreciated that where the leaf spring 2 is offset, so that it can assume a negative camber, it is preferably mounted above the axle so that the main chassis member 2 does not have to be arched excessively, if at all, or deep droppers provided to secure the ends of the springs.

Although it is not illustrated, coil or other compression springs such as rubber or pneumatic springs may be used, the modifications necessary being apparent to a person skilled in the art. Thus with coil springs a suitable mounting would be secured on to the axle and another to the chassis. It is almost invariable that the coil springs would be offset into the wheel arch of the chassis and they would preferably incline forwardly at the top in the direction of trailed motion. The shock absorber if one was provided could run axially inside the spring, the radius arm would be provided as before in any one of the described embodiments but more robust to provide lateral stiffness.

From the above description it will be appreciated that a simple, relatively cheap suspension is provided having easily adjustable means enabling the steering characteristics to be adjusted to suit the particular vehicle on which the suspension is installed.

What I claim is:
1. A suspension, for a trailed vehicle, comprisng:
   i. a beam axle
   ii. respective spring means positioned adjacent each end of said beam axle
   iii. respective axle mounting means securing said spring means to said beam axle
   iv. respective means for mounting said spring means to a trailed vehicle and adapted to permit limited movement of the spring means longitudinally of the trailed vehicle
   v. a respective leading radius arm positioned adjacent each end of the beam axle, said radius arm being pivotably attachable at one of its ends to the trailed vehicle and pivotably coupled at least indirectly at its other end to said beam axle, the arrangement being such that, when the suspension is mounted on the trailed vehicle, the first end of the radius arm is at a position higher than said second end of the radius arm for all conditions of loading of the spring means, whereby as the beam axle moves upwardly at an end in response to bump conditions it is also caused by the respective radius arm to move in the forward direction of movement of the trailed vehicle and thereby undergo a steering effect tending to oppose the effects on the trailed vehicle of the displacing force.

2. In combination, a trailed vehicle including a chassis and a suspension therefor as set forth in claim 1, said spring mounting means being secured to said chassis, and said respective radius arms each having their one end pivotably attached to said chassis.

3. The suspension of claim 1, wherein means for coupling said radius arms to said trailed vehicle and to said beam axle are adjustable to permit the inclination of the radius arm to the horizontal, in the normal static loading condition of the suspension, to be altered to a selected one of a plurality of positions.

4. The suspension of claim 1, wherein the springs are leaf springs and are constructed to be substantially linear under normal static load.

5. The suspension of claim 1, wherein the springs are leaf springs, and wherein said spring mounting means are slippers for each end of said leaf springs, and wherein a respective shock absorber is coupled adjacent each end of the beam axle at the leading side thereof considered in the direction of movement of the trailed vehicle.

6. A suspension as claimed in claim 1, wherein the springs are compression springs.

7. A trailed vehicle as claimed in claim 1, wherein the springs are leaf springs and each lies under a main chassis longitudinal member and passes under the beam axle and each radius arm is offset from the plane of its associated spring on the side adjacent its associated axle end.

8. A trailed vehicle as claimed in claim 1, wherein each of the springs is offset from its associated main longitudinal chassis member to lie closer to the associated hub and the radius arms are also offset from the main longitudinal chassis members to lie closer to their associated axle ends.

9. A trailed vehicle as claimed in claim 8, wherein the springs pass over the axle and each radius arm is directly over its associated spring.

10. A trailed vehicle as claimed in claim 8, wherein the springs pass over the axle and the radius arms are offset from the springs so that each lies closer to its adjacent hub than the associated spring and the lower end of each radius arm is coupled to the beam axle beside the spring.

11. A trailed vehicle as claimed in claim 1, wherein the springs are compression springs mounted forwardly of the axle.

* * * * *